(12) United States Patent
Berggren et al.

(10) Patent No.: US 12,035,235 B2
(45) Date of Patent: Jul. 9, 2024

(54) METHOD AND APPARATUS FOR NETWORK MANAGEMENT OF ASSISTANCE INFORMATION SIGNALING

(71) Applicant: Sony Corporation, Tokyo (JP)

(72) Inventors: Anders Berggren, Lund (SE); Rickard Ljung, Lund (SE); Basuki Priyanto, Lund (SE); Nafiseh Mazloum, Lund (SE)

(73) Assignee: Sony Group Corporation, Tokyo (JP)

( * ) Notice: Subject to any disclaimer, the term of this patent is extended or adjusted under 35 U.S.C. 154(b) by 256 days.

(21) Appl. No.: 17/275,255

(22) PCT Filed: Nov. 12, 2019

(86) PCT No.: PCT/US2019/060866
§ 371 (c)(1),
(2) Date: Mar. 11, 2021

(87) PCT Pub. No.: WO2020/102159
PCT Pub. Date: May 22, 2020

(65) Prior Publication Data
US 2022/0046536 A1    Feb. 10, 2022

(30) Foreign Application Priority Data
Nov. 12, 2018  (SE) ..................... 1830328-9

(51) Int. Cl.
*H04W 52/02*    (2009.01)
(52) U.S. Cl.
CPC ............... *H04W 52/0212* (2013.01)

(58) Field of Classification Search
None
See application file for complete search history.

(56) References Cited

U.S. PATENT DOCUMENTS 9,112,717 B2 *   8/2015  Klein ............... H04W 52/0235
2010/0302980 A1 * 12/2010 Ji ..................... H04W 52/0216
                                                      370/311

(Continued)

FOREIGN PATENT DOCUMENTS

CN    101978653   *   2/2011
CN    103581861 A     2/2014

(Continued)

OTHER PUBLICATIONS

U.S. Appl. No. 62/647,279, filed Mar. 23, 2018; (Year: 2018).*

(Continued)

*Primary Examiner* — Andre Tacdiran
(74) *Attorney, Agent, or Firm* — Tucker Ellis LLP (57) ABSTRACT

A network node (12, 17) dynamically configures and controls assistance information transmissions by wireless communications devices (14) in a wireless communications system (10). The assistance information facilitates performance of power saving adaptations for the wireless communications device (14). The network node (12, 17) configures what information to indicate in assistance information messages, how the message is sent by wireless communications devices (14), and/or when the message should be signaled. The wireless communications devices (14) transmit assistance information messages in accordance with configuration parameters signaled by the network node (12, 17).

20 Claims, 4 Drawing Sheets (56) References Cited

U.S. PATENT DOCUMENTS

| | | | |
|---|---|---|---|
| 2014/0036750 A1* | 2/2014 | Yavuz | H04W 52/0216 370/311 |
| 2014/0044029 A1 | 2/2014 | Chou et al. | |
| 2014/0269995 A1* | 9/2014 | Shi | H04B 7/0871 375/316 |
| 2015/0017998 A1* | 1/2015 | Koskinen | H04W 72/543 455/450 |
| 2015/0029917 A1* | 1/2015 | Kim | H04W 52/0209 370/311 |
| 2015/0092641 A1* | 4/2015 | Koc | H04L 65/60 370/311 |
| 2015/0124676 A1* | 5/2015 | Song | H04L 5/0073 370/330 |
| 2016/0100362 A1 | 4/2016 | Palanisamy et al. | |
| 2016/0249405 A1* | 8/2016 | Koc | H04L 69/321 |
| 2017/0019820 A1 | 1/2017 | Das | |
| 2017/0142575 A1* | 5/2017 | Quan | H04W 8/24 |
| 2018/0123765 A1* | 5/2018 | Cao | H04L 1/1861 |
| 2019/0090299 A1* | 3/2019 | Ang | H04W 52/0229 |
| 2019/0297577 A1* | 9/2019 | Lin | H04W 52/0216 |
| 2022/0377801 A1* | 11/2022 | Lei | H04W 74/006 |

FOREIGN PATENT DOCUMENTS

| | | | |
|---|---|---|---|
| CN | 104285387 A | | 1/2015 |
| CN | 104584672 A | | 4/2015 |
| CN | 107257587 A | | 10/2017 |
| CN | 107371152 A | | 11/2017 |
| EP | 2858452 A1 | | 4/2015 |
| GB | 2547028 | * | 8/2017 |
| JP | 2015530017 | * | 10/2015 |
| JP | 2020507257 A | | 3/2020 |
| KR | 20070039855 | * | 4/2007 |
| KR | 10-2017-0020548 A | | 2/2017 |
| WO | WO-2011024646 A1 | | 3/2011 |
| WO | 2015171984 A1 | | 11/2015 |

OTHER PUBLICATIONS

U.S. Appl. No. 62/655,408, filed Apr. 10, 2018; (Year: 2018).*
U.S. Appl. No. 62/656,191, filed Apr. 11, 2018; (Year: 2018).*
U.S. Appl. No. 62/660,586, filed Apr. 20, 2018; (Year: 2018).*
U.S. Appl. No. 62/661,833, filed Apr. 24, 2018; (Year: 2018).*
U.S. Appl. No. 62/664,521, filed Apr. 30, 2018; (Year: 2018).*
U.S. Appl. No. 62/665,687, filed May 2, 2018; (Year: 2018).*
U.S. Appl. No. 62/680,826, filed Jun. 5, 2018; (Year: 2018).*
U.S. Appl. No. 62/683,352, filed Jun. 11, 2018; (Year: 2018).*
U.S. Appl. No. 62/690,058, filed Jun. 26, 2018; (Year: 2018).*
U.S. Appl. No. 62/724,985, filed Aug. 30, 2018; (Year: 2018).*
U.S. Appl. No. 62/726,629, filed Sep. 4, 2018; (Year: 2018).*
U.S. Appl. No. 62/741,947, filed Oct. 5, 2018; (Year: 2018).*
U.S. Appl. No. 62/755,222, filed Nov. 2, 2018; (Year: 2018).*
Samsung, "Triggering adaptation schemes", 3rd Generation Partnership Project (3GPP), Nov. 2018, Spokane, USA, R1-1813012, 11 pages.
Intel Corporation, "Analysis of Power Preference Indication Timer", 3rd Generation Partnership Project (3GPP), Bratislava, Slovakia, Oct. 2012, R2-124986, 8 pages.
Office Action from corresponding Korean Application No. 10-2021-7009280 mailed on Jan. 14, 2022.
International Search Report and Written Opinion from corresponding International Application No. PCT/US2019/060866 mailed on Apr. 30, 2020, 14 pages.
Office Action from corresponding Swedish Application No. 1830328-9 mailed on May 15, 2019.
Sony, "Conditions and procedures for adaptation of power consumption characteristics", 3rd Generation Partnership Project (3GPP), Nov. 2018, Spokane, USA, R1-1812750, 6 pages.
Apple Inc., "Power Saving Techniques based on UE Adaptation", 3rd Generation Partnership Project (3GPP), Nov. 2018, Spokane, USA, R1-1812925, 18 pages.
Huawei et al., "Power saving techniques", 3rd Generation Partnership Project (3GPP), Nov. 2018, Spokane, USA, R1-1812231, 8 pages.
"Evolved Universal Terrestrial Radio Access (E-UTRA), Radio Resource Control (RRC)", Technical Specification Group Radio Access Network, 3rd Generation Partnership Project (3GPP), Sep. 2018, France, TS 36.331, V15.3.0, 918 pages.
CMCC, "Email discussion report [99#33][LTE/eVILTE] US assistance information", 3rd Generation Partnership Project (3GPP), Nov. 2017, Reno, USA, R2-1713234, 8 pages.

* cited by examiner

METHOD AND APPARATUS FOR NETWORK MANAGEMENT OF ASSISTANCE INFORMATION SIGNALING

RELATED APPLICATION DATA

This application claims the benefit of Swedish Patent Application No. 1830328-9, filed Nov. 12, 2018, the disclosure of which is incorporated herein by reference in its entirety.

TECHNICAL FIELD OF THE INVENTION

The technology of the present disclosure relates generally to wireless communications in a network environment and, more particularly, to a method and apparatus for managing assistance information signaling by the network.

BACKGROUND

Demand for data traffic on wireless communication system continues to increase. Since widespread commercialization of fourth generation (4G) wireless systems, such as a Long Term Evolution (LTE) system or an LTE-Advanced (LTE-A) system standardized by the 3rd Generation Partnership Project (3GPP), next generation wireless systems are being developed. Once such system, by the 3GPP, is a fifth generation (5G) or New Radio (NR) wireless system.

The NR system, a first version of which was specified during 3GPP Release 15, is a communication protocol for enhanced mobile broadband (eMBB), which allows for large frequency band allocations, high order modulations, and advanced multi-antenna solutions. The system design, however, may result in relatively higher power consumption from a user equipment (UE) perspective. In particular, UE power consumption may increase as the UE may be required to handle large bandwidths, many different connections, beams, etc. Therefore, solutions that leverage opportunity to reduce power consumptions are beneficial in NR systems as well as other wireless communication systems.

SUMMARY

The disclosed approach provides dynamic, network-managed signaling of assistance information by wireless communications devices (e.g. UEs) in a wireless communications system to facilitate reduced power consumption. A plurality of configurations may be implemented by a network node for a UE in order to achieve high system throughput. UEs configured to support high throughput, however, may result in higher power consumption. The network node may adjust the configuration of the UE to enable power savings, e.g. according to traffic load variations for the UE. These adaptations or power savings techniques may benefit from input from the UE. The network node may configure the UE to transmit the assistance information to the network node to facilitate performing the power saving adaptations to the UE's configuration. In particular, the network node may manage the UE in regard to what information to transmit and when that information should be transmitted. For example, the network may configure the UE to indicate preferences for certain power saving techniques and the timings for such preferences.

According to one aspect of the disclosure, a method, performed by a network node in a wireless communications network, for controlling transmission of assistance information related to power saving techniques by a wireless communications device includes transmitting a control message to the wireless communications device that specifies configuration information for transmission of the assistance information; and receiving the assistance information transmitted from the wireless communications device in accordance with the configuration.

According to one embodiment, the method, performed by a network node in a wireless communications network, for controlling transmission of assistance information related to power saving techniques by a wireless communications device includes transmitting a control message to the wireless communications device that specifies configuration information for transmission of the assistance information relating to one or more power saving techniques. The configuration information includes respective configurations for the one or more power saving techniques. The respective configurations include one or more of a condition that triggers a transmission of assistance information associated with a respective power saving technique, or a resource allocation for the transmission of the assistance information associated with the respective power saving technique. The method further includes receiving the assistance information transmitted from the wireless communications device in accordance with the configuration information.

According to one embodiment of the method, the configuration information includes one or more of: one or more power saving techniques for which a preference is to be included in the assistance information; one or more conditions that trigger transmission of the assistance information; one or more timing criteria for transmissions of the assistance information; or scheduling information for the transmission of the assistance information.

According to one embodiment of the method, the configuration information includes, for each power saving technique specified, one or more of: a condition that triggers transmission of the assistance information associated with the power saving technique; or timing criteria for transmission of the assistance information associated with the power saving technique.

According to one embodiment of the method, transmitting the control message includes transmitting an assistance information configuration signal to the wireless communications device.

According to one embodiment of the method, the assistance information received from the wireless communications device includes respective preferences associated with one or more power saving techniques.

According to one embodiment of the method, transmitting the control message includes transmitting a response signal to the wireless communications device that includes one or more acknowledgments respectively associated with one or more preferences specified in a received assistance information message.

According to one embodiment, the method also includes transmitting a response signal to the wireless communications device that includes an acknowledgment to proceed with the one or more power saving techniques indicated as preferred in the assistance information received from the wireless communications device.

According to one embodiment of the method, the acknowledgement includes a set of acknowledgements respectively associated with the one or more power saving techniques indicated as preferred in the assistance information.

According to one embodiment of the method, the acknowledgement is transmitted via a control channel to ensure execution of power savings techniques by the wireless communications device with lower latency.

According to one embodiment of the method, the response signal further includes updated configuration information related to conditions associated with one or more power saving techniques.

According to one embodiment of the method, the response signal to the wireless communications device indicates that at least one power saving technique is not granted.

According to one embodiment, the method includes receiving a repeat request from the wireless communications device that reasserts preferences previously specified in the assistance information.

According to one embodiment of the method, the response signal includes updated configuration information relative to the configuration information included in the assistance information configuration signal.

According to one embodiment of the method, receiving the assistance information includes receiving an assistance information repeat request from the wireless communications device.

According to one embodiment of the method, the assistance information repeat request includes a request bit that points to a previous assistance information message.

According to one embodiment, the method includes transmitting a signal to the wireless communications device to halt assistance information transmissions.

According to one embodiment, the method includes transmitting a signal to the wireless communications device to restart assistance information transmissions.

According to another aspect of the disclosure, a method for transmitting assistance information related to power saving operations includes receiving a control message from a network node of a wireless communications system, the control message includes configuration information for transmissions of assistance information; and transmitting an assistance information message to the network node in accordance with the configuration information.

According to one embodiment, a method for transmitting assistance information related to power saving operations includes receiving a control message from a network node of a wireless communications system. The control message includes configuration information for transmissions of assistance information. The configuration information includes respective configurations for the one or more power saving techniques. The respective configurations include one or more of a condition that triggers a transmission of assistance information associated with a respective power saving technique, or a resource allocation for the transmission of the assistance information associated with the respective power saving technique. The method also includes transmitting an assistance information message to the network node in accordance with the configuration information.

According to one embodiment of the method, the configuration information includes one or more of: one or more power saving techniques for which the wireless communications device indicates a preference in the assistance information message; resource allocation information for the assistance information message; one or more conditions that trigger transmission of the assistance information message; or timing criteria for transmissions of the assistance information message.

According to one embodiment of the method, the configuration information, for each power saving technique indicated, specifies at least one of: a condition that triggers transmission of the assistance information associated with the power saving technique; or timing criteria for transmission of the assistance information associated with the power saving technique.

According to one embodiment, the method includes determining that at least one of a trigger condition or a timing condition is satisfied; and transmitting the assistance information message to the network node.

According to one embodiment of the method, transmitting the assistance information message includes transmitting assistance information associated with the power saving technique corresponding to satisfied trigger conditions.

According to one embodiment of the method, the assistance information message includes preferences for power saving adaptations to one or more of: a time-domain operation; a frequency-domain operation; an antenna configuration; or a signal processing configuration.

According to one embodiment of the method, receiving the control message comprises receiving a response signal from the network node, wherein the response signal includes at least one: an acknowledgement to proceed with the one or more power saving techniques indicated as preferred in the assistance information; or updated configuration information for assistance information transmissions.

According to one embodiment of the method, the acknowledgement includes a set of acknowledgements respectively associated with the one or more power saving techniques indicated as preferred in the assistance information.

According to one embodiment, the method includes transmitting a repeat request that reasserts preferences specified in a previous assistance information message.

According to one embodiment, the method includes receiving a signal from the network node to halt assistance information transmissions.

According to one embodiment, the method includes receiving a signal from the network node to restart assistance information transmissions; and resuming assistance information transmission in accordance with the configuration information included in the control message.

According to another aspect of the disclosure, a network node in a wireless communication system includes a wireless interface over which wireless communications with wireless communications devices are carried out; and a control circuit configured to manage transmissions of assistance information by the wireless communications devices, wherein the control circuit causes the network node to: transmit a control message to a wireless communications device that specifies configuration information for transmissions of the assistance information; and receive an assistance information message transmitted from the wireless communications device in accordance with the configuration information.

According to one embodiment of the network node, the configuration information includes one or more of: one or more power saving techniques for which a preference is to be included in the assistance information; one or more conditions that trigger transmission of the assistance information; timing criteria for transmissions of the assistance information; or scheduling information for the transmission of the assistance information message.

According to one embodiment of the network node, the configuration information includes, for each power saving technique specified, one or more of: a condition that triggers transmission of the assistance information associated with the power saving technique; or timing criteria for transmission of the assistance information associated with the power saving technique.

According to one embodiment of the network node, the control message is an assistance information configuration signal.

According to one embodiment of the network node, the control message is a response signal that includes one or more acknowledgments respectively associated with one or more preferences specified in a received assistance information message.

According to one embodiment of the network node, the response signal includes updated configuration information with respect to the configuration information include in the assistance information configuration signal.

According to one embodiment of the network node, the assistance information message is an assistance information repeat request received from the wireless communications device.

According to one embodiment of the network node, the control circuit further causes the network node to transmit a signal to the wireless communications device to halt assistance information transmissions.

According to one embodiment of the network node, the control circuit further causes the network node to transmit a signal to the wireless communications device to restart assistance information transmissions.

According to another aspect of the disclosure, a network node in a wireless communications system includes a wireless interface over which wireless communications with wireless communications devices are carried out and a control circuit configured to manage transmissions of assistance information by the wireless communications devices. The control circuit causes the network node to: transmit a control message to a wireless communications device (14) that specifies configuration information for transmission of assistance information relating to one or more power saving techniques, the configuration information includes respective configurations for the one or more power saving techniques, the respective configurations include one or more of: a condition that triggers a transmission of assistance information associated with a respective power saving technique, or a resource allocation for the transmission of the assistance information associated with the respective power saving technique; and receive the assistance information message transmitted from the wireless communications device in accordance with the configuration information.

According to one embodiment of the network node, the assistance information received from the wireless communications device includes respective preferences associated with one or more power savings techniques, the respective preferences being respective triggered in accordance with respective configuration information.

According to one embodiment of the network node, the control circuit further causes the network node to transmit a response signal to the wireless communications device that includes at least one of: an acknowledgment to proceed with the one or more power saving techniques indicated as preferred in the assistance information received from the wireless communications device or a set of acknowledgements respectively associated with the one or more power saving techniques indicated as preferred in the assistance information.

According to another aspect of the disclosure, a wireless communications device includes a wireless interface over which wireless communications with a network node are carried out; and a control circuit configured to control the wireless communications device, wherein the control circuit configures the wireless communications device to: receive a control message from the network node of a wireless communications system, the control message includes configuration information for transmissions of assistance information; and transmit an assistance information message to the network node in accordance with the configuration information.

According to one embodiment of the wireless communications device, the configuration information includes one or more of: one or more power saving techniques for which the wireless communications device indicates a preference in the assistance information message; resource allocation information for the assistance information message; one or more conditions that trigger transmission of the assistance information message; or timing criteria for transmissions of the assistance information message.

According to one embodiment of the wireless communications device, for each power saving technique indicated, the configuration information specifies at least one of: a condition that triggers transmission of the assistance information associated with the power saving technique; or timing criteria for transmission of the assistance information associated with the power saving technique.

According to one embodiment of the wireless communications device, the control circuit further causes the wireless communications device to: determine that at least one of a trigger condition or a timing condition is satisfied; and transmit the assistance information message to the network node.

According to one embodiment of the wireless communications device, the control circuit further causes the wireless communications device to transmit assistance information associated with the power saving technique corresponding to the trigger condition or timing condition satisfied.

According to one embodiment of the wireless communications device, the assistance information message includes preferences for power saving adaptations to one or more of: a time-domain operation; a frequency-domain operation; an antenna configuration; or a processing configuration.

According to one embodiment of the wireless communications device, the control message is a response signal from the network node following transmission of a previous assistance information message, wherein the response signal includes at least one of: one or more acknowledgements respectively associated with one or more preferences indicated in the previous assistance information message; or updated configuration information for assistance information transmissions.

According to one embodiment of the wireless communications device, the control circuit further causes the wireless communications device to transmit an assistance information repeat request to the network node.

According to one embodiment of the wireless communications device, the control circuit further causes the wireless communications device to receive a signal from the network node to halt assistance information transmissions.

According to one embodiment of the wireless communications device, the control circuit further causes the wireless communications device to: receive a signal from the network node to restart assistance information transmissions; and resume assistance information transmissions in accordance with the configuration information included in the control message.

According to another aspect of the disclosure, a wireless communications device includes a wireless interface over which wireless communications with a network node are carried out; and a control circuit configured to control the wireless communications device, wherein the control circuit configures the wireless communications device to: receive a control message from the network node (12) of a wireless communications system (10), the control message includes configuration information for transmissions of assistance information, the configuration information includes respective configurations for the one or more power saving techniques, the respective configurations include one or more of: a condition that triggers a transmission of assistance information associated with a respective power saving technique, or a resource allocation for the transmission of the assistance information associated with the respective power saving technique; and transmit an assistance information message to the network node in accordance with the configuration information.

According to one embodiment of the wireless communications device, the control circuit further causes the wireless communications device to, for a plurality of configuration preferences available for the wireless communications device, combine information indicative of the plurality of configuration preferences and transmit the information combined to the network node.

DETAILED DESCRIPTION OF EMBODIMENTS

Introduction

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

Described below, in conjunction with the appended figures, are various embodiments of systems and methods for dynamic configuration and control of assistance information transmissions by UEs in a wireless communications system. The assistance information facilitates performance of power saving adaptations for the UEs. A network node of a wireless communications system may configure a UE with parameters that specify what information to indicate in an assistance information message, how the message is sent, and/or when the message should be signaled. The UE transmits the assistance information message in accordance with the configuration parameters. The network node may also signal the UE to halt or resume transmissions of the assistance information.

System Architecture

Figure 1:
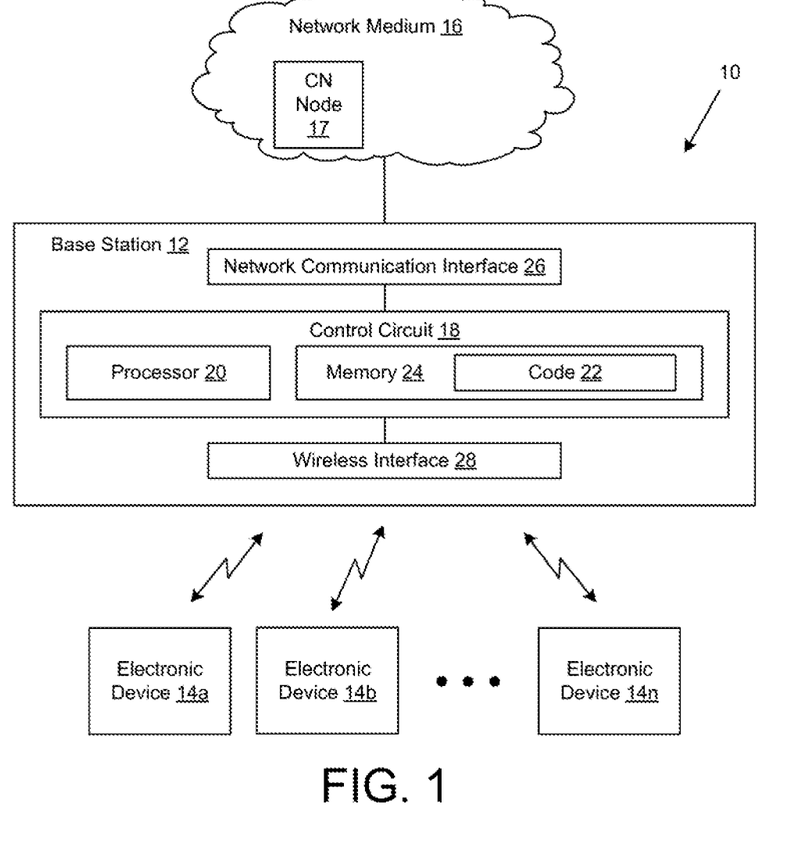
FIG. 1 is a schematic block diagram of a network communication system that enables network-managed transmissions of assistance information from communications devices.

FIG. 1 is a schematic diagram of an exemplary network communication system 10 for implementing the disclosed techniques. It will be appreciated that the illustrated communication system is representative and other systems may be used to implement the disclosed techniques. The exemplary network system 10 includes a radio access network node 12, which is also referred to as base station 12, that operates in accordance with a cellular protocol, such as a protocol promulgated by 3GPP or another standard. For instance, the network system 10 may operate in accordance with LTE, LTE-A, or a 5G NR standards. However, it is to be appreciated that the techniques described herein can be applied to substantially any wireless or wired communication system to enable dynamic, network-managed transmissions of assistance information to facilitate power saving adaptations.

The network communication system 10 of the illustrated example supports cellular-type protocols, which may include circuit-switched network technologies and/or packet-switched network technologies. The network communication system 10 includes a base station 12 that services one or more electronic devices 14 (e.g. UEs or wireless communications devices), designated as electronic devices 14a through 14n in FIG. 1. The base station 12 may support communications between the electronic devices 14 and a network medium 16 through which the electronic devices 14 may communicate with other electronic devices 14, servers, devices on the Internet, etc. The network medium 16 may include one or more core network (CN) nodes such as CN node 17. The base station 12 may be an access point, an evolved NodeB (eNB) in a 4G network, a next generation NodeB (gNB) in a 5G or NR network, or another network node. As utilized herein, the term "base station" may refer, generally, to any device or network node that services user devices and enables or facilitates communications between the user devices and the network medium and, thus, includes the specific examples above and other supporting network nodes depending on the network implementation.

Network communication system 10 may be a system, such as an NR system, that provides a plurality of features or functionality aimed to improve system and link throughput. For example, system 10 may employ multiple component carriers for carrier aggregation, multiple antennas for MIMO operations, allocation of bandwidth parts (e.g., smaller portions of bandwidth compared to a total system bandwidth), etc. These features also contribute to power consumptions in UEs. Accordingly, various power saving techniques may be employed by system 10 to counteract these effects. Some power saving techniques or adaptations may dynamically control these features in UEs. For example, power saving techniques may involve adaptations to time-domain operation (e.g. DRX operation, PDCCH monitoring), adaptations to frequency-domain operation (e.g. configuration of bandwidth parts, component carrier and/or carrier aggregation configuration), adaptations to UE processing (e.g. MIMO operations, processing time, modulations, etc.), and/or reductions in blind decoding of control channels.

These power saving techniques may benefit from input from the UEs. To reduce signaling overhead, input associated with all the available power saving techniques may be aggregated into an assistance information message transmitted by the UEs. Moreover, the manner in which these power saving techniques are performed may be implementation specific and controlled by an operator. Accordingly, management and/or control of UE transmissions of assistance information may improve the efficacy of the UE input in performing the power saving adaptations.

In some systems, for example LTE systems, a UE may indicate preferences to the networks. For instance, the UE may indicates preferences related to a delay budget for DRX, power preferences, preferences for semi persistent scheduling, etc. In LTE, transmission of a power preference may be activated through RRC connection configuration or reconfiguration. The power preference indication may specify a preference for a configuration optimized for power saving or a preference for a configuration association with normal power consumption. Thus, power preference indications in LTE are static and include a single parameter. Somewhat related, a UE may signal an overheat indicator to the network. In response, the network may act to reduce the UE's computational load by, for example, reducing a number of MIMO layers or a number of component carriers. This indicator, however, is triggered when the UE suffers from overheating and the network cannot control how or when the UE provides such information.

According to an aspect, a network node (e.g., base station 12, CN node 17, or a combination of the two) may control UEs (e.g., electronic devices 14) regarding how to perform assistance information signaling to support power saving adaptations. In particular, the network node may configure the UEs regarding when assistance information is transmitted and what information is included. The assistance information from the UEs may be detailed and signaled via layer 1 signaling (e.g. control channel signaling) for lower latency and quicker power saving adaptations.

The network node may configure an electronic device 14 to transmit assistance information in accordance with network preferences. In particular, the base station 12 may signal configuration parameters, including values, for the assistance information transmissions. The signaling may be RRC signaling or, alternatively, layer 1 signaling for lower latency. As described in greater detail below, the configuration message may be in the form of an assistance information configuration signal or an assistance information response signal.

In one aspect, for a plurality of configuration preferences that the electronic device 14 may indicate, the electronic device 14 may combine that information and initially send that information to the base station 12. For instance, a default or predetermined list of configurations may be known. Each item in the list may correspond to a particular power saving technique such that adapting a configuration in the list promotes power saving in the electronic device 14. Thus, initial assistance information may indicate a preference for which configurations should be adapted and/or which configurations should not be adapted across all configurations in the predetermined list. In another aspect, the base station 12 may indicate a subset of the plurality of configuration preferences that the electronic device 14 reports to the network. The subset may be indicated prior to the electronic device 14 transmitting any assistance information. Alternatively, the subset may be indicated after the initial transmission to dynamically change future assistance information transmissions.

The base station 12 may also indicate trigger conditions and/or timing conditions that, when satisfied, cause the electronic device 14 to transmit assistance information. The trigger conditions and/or timing conditions may be preference-specific. For each configuration preference the electronic device 14 reports to the network, the base station 12 may configure a specific trigger condition or timing. Accordingly, different portions of the assistance information may be triggered by different conditions and/or may be transmitted at different intervals. The base station 12 may also configure resources to be utilized by the electronic device 14 for assistance information transmissions.

The assistance information transmitted by the electronic device 14 to the base station 12 may include a list to suggest power saving techniques preferred by the electronic device 14. For example, a bitmap may be utilized to indicate whether or not a particular technique is preferred. These preferences may be based on the electronic device's 14 traffic conditions, for example. In addition, the assistance information may include parameter preferences (e.g. preferred configurations) associated with the various power saving techniques.

In another aspect, the base station 12 may transmit a response signal to the electronic device 14. The response signal may include an acknowledgement and/or a grant for an entire list of preferences included in the assistance information or a subset of the list. The response signal may also include updated configuration parameters for assistance information transmissions that override a previous configuration. In one aspect, the response signal may be transmitted subsequent to a previous configuration message. Alternatively, the response signal may follow a default assistance information transmission that has not be previously configured by the network.

According to a further aspect, the electronic device 14 may transmit a repeat request signal to the base station 12. The repeat request signal may be a flag that informs the network to reconsider previously transmitted assistance information. The repeat request signal may be transmitted in accordance with corresponding trigger conditions and/or timing conditions. The trigger conditions or timing conditions may be different from the conditions associated with the assistance information message.

The network may activate or deactivate assistance information transmissions. When deactivated, the electronic device 14 suspends transmissions of assistance information or power saving requests. When reactivated, the electronic device 14 resumes transmissions of assistance information in accordance with the previous configuration. The network may also reconfigure the transmissions after resuming via a configuration control message and/or a response signal.

As described herein, the network may dynamically configure assistance information transmissions by electronic devices 14 in order to enable reduced power consumption or to control electronic devices 14 providing assistance information to avoid unnecessary signaling. Dynamic configuration may be performed by the base station 12, CN node 17, or both. The base station 12 may include operational components for carrying out configuration and control of assistance information transmissions as described herein, in addition to general wireless communications, and other functions of the base station 12. For instance, the base station 12 may include a control circuit 18 that is responsible for overall operation of the base station 12, including controlling the base station 12 to carry out the operations described in greater detail below. The control circuit 18 includes a processor 20 that executes code 22, such as an operating system and/or other applications. The functions described in this disclosure document may be embodied as part of the code 22 or as part of other dedicated logical operations of the base station 12. The logical functions and/or hardware of the base station 12 may be implemented in other manners depending on the nature and configuration of the base station 12. Therefore, the illustrated and described approaches are just examples and other approaches may be used including, but not limited to, the control circuit 18 being implemented as, or including, hardware (e.g., a microprocessor, microcontroller, central processing unit (CPU), etc.) or a combination of hardware and software (e.g., a system-on-chip (SoC), an application-specific integrated circuit (ASIC), etc.).

The code 22 and any stored data (e.g., data associated with the operation of the base station 12) may be stored on a memory 24. The code may be embodied in the form of executable logic routines (e.g., a software program) that is stored as a computer program product on a non-transitory computer readable medium (e.g., the memory 24) of the base station 12 and is executed by the processor 20. The functions described as being carried out by the base station 12 may be thought of as methods that are carried out by the base station 12.

The memory 24 may be, for example, one or more of a buffer, a flash memory, a hard drive, a removable media, a volatile memory, a non-volatile memory, a random access memory (RAM), or other suitable device. In a typical arrangement, the memory 24 includes a non-volatile memory for long term data storage and a volatile memory that functions as system memory for the control circuit 18. The memory 24 is considered a non-transitory computer readable medium.

The base station 12 includes communications circuitry that enables the base station 12 to establish various communication connections. For instance, the base station 12 may have a network communication interface 26 to communicate with the network medium 16. Also, the base station 12 may have a wireless interface 28 over which wireless communications are conducted with the electronic devices 14, including assistance information control signaling and assistance information messages described herein. The wireless interface 28 may include a radio circuit having one or more radio frequency transceivers (also referred to as a modem), at least one antenna assembly, and any appropriate tuners, impedance matching circuits, and any other components needed for the various supported frequency bands and radio access technologies.

Though not shown in FIG. 1, CN node 17 may include structural components similar to base station 12. For instance, CN node 17 may include a control circuit with a processor and a memory to execute code. The CN node 17 may also include various communications interfaces to enable communication with other nodes, such as other core network nodes, nodes of the radio access network (e.g. base station 12), etc.

The electronic devices 14 serviced by the base station 12 may be user devices, also known as user equipment or UEs, wireless communications devices, or machine-type devices. Exemplary electronic devices 14 include, but are not limited to, mobile radiotelephones (such as "smartphones"), tablet computing devices, computers, a device that uses machine-type communications, machine-to-machine (M2M) communications or device-to-device (D2D) communication (e.g., a sensor, a machine controller, an appliance, etc.), a camera, a media player, or any other device that conducts wireless communications with the base station 12.

Figure 2:
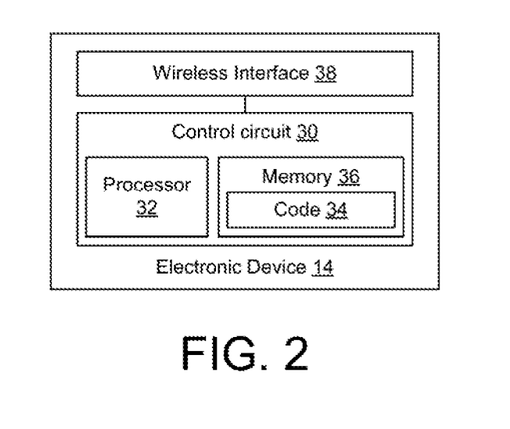
FIG. 2 is a schematic block diagram of an electronic device that forms part of the network communication system of FIG. 1.

As shown in FIG. 2, each electronic device 14 may include operational components for carrying out the wireless communications, the assistance information transmissions described herein and other functions of the electronic device 14. For instance, among other components, each electronic device 14 may include a control circuit 30 that is responsible for overall operation of the electronic device 14, including controlling the electronic device 14 to carry out the operations described in greater detail below. The control circuit 30 includes a processor 32 that executes code 34, such as an operating system and/or other applications. The functions described in this disclosure document may be embodied as part of the code 34 or as part of other dedicated logical operations of the electronic device 14. The logical functions and/or hardware of the electronic device 14 may be implemented in other manners depending on the nature and configuration of the electronic device 14. Therefore, the illustrated and described approaches are just examples and other approaches may be used including, but not limited to, the control circuit 30 being implemented as, or including, hardware (e.g., a microprocessor, microcontroller, central processing unit (CPU), etc.) or a combination of hardware and software (e.g., a system-on-chip (SoC), an application-specific integrated circuit (ASIC), etc.).

The code 34 and any stored data (e.g., data associated with the operation of the electronic device 14) may be stored on a memory 36. The code 34 may be embodied in the form of executable logic routines (e.g., a software program) that is stored as a computer program product on a non-transitory computer readable medium (e.g., the memory 36) of the electronic device 14 and is executed by the processor 32. The functions described as being carried out by the electronic device 14 may be thought of as methods that are carried out by the electronic device 14.

The memory 36 may be, for example, one or more of a buffer, a flash memory, a hard drive, a removable media, a volatile memory, a non-volatile memory, a random access memory (RAM), or other suitable device. In a typical arrangement, the memory 36 includes a non-volatile memory for long term data storage and a volatile memory that functions as system memory for the control circuit 30. The memory 36 is considered a non-transitory computer readable medium.

The electronic device 14 includes communications circuitry that enables the electronic device 14 to establish various communication connections. For instance, the electronic device 14 may have a wireless interface 38 over which wireless communications are conducted with the base station 12, including the dynamic bandwidth allocation procedures described herein. The wireless interface 38 may include a radio circuit having one or more radio frequency transceivers (also referred to as a modem), at least one antenna assembly, and any appropriate tuners, impedance matching circuits, and any other components needed for the various supported frequency bands and radio access technologies.

Other components of the electronic device 14 may include, but are not limited to, user inputs (e.g., buttons, keypads, touch surfaces, etc.), a display, a microphone, a speaker, a camera, a sensor, a jack or electrical connector, a rechargeable battery and power supply unit, a SIM card, a motion sensor (e.g., accelerometer or gyro), a GPS receiver, and any other appropriate components.

Network-Managed Transmission of Assistance Information

The network communication system 10 may dynamically adapt various configurations for the electronic device 14 in order to implement power saving techniques. These adaptations may benefit from input from the electronic device 14. Such input may be in the form of assistance information transmitted by the electronic device 14 to the base station 12. The assistance information may include the electronic device's 14 preferences regarding which configurations to adapt and/or preferences regarding how such configurations should be changed.

The network may dynamically manage assistance information transmissions by the electronic device 14. For example, such network-based control may seek to consolidate adaptation requests and other preferences associated with a plurality of power saving techniques to reduce signaling overhead. In another example, network management of assistance information transmission may limit the adaptations the electronic device 14 may request or the configurations the electronic device 14 may indicate preference for, as well as specifying when such information should be transmitted (e.g. trigger conditions), how often (e.g. timing intervals, maximum attempts, etc.), and on what resources (e.g. frequency and time information).

Figure 3:
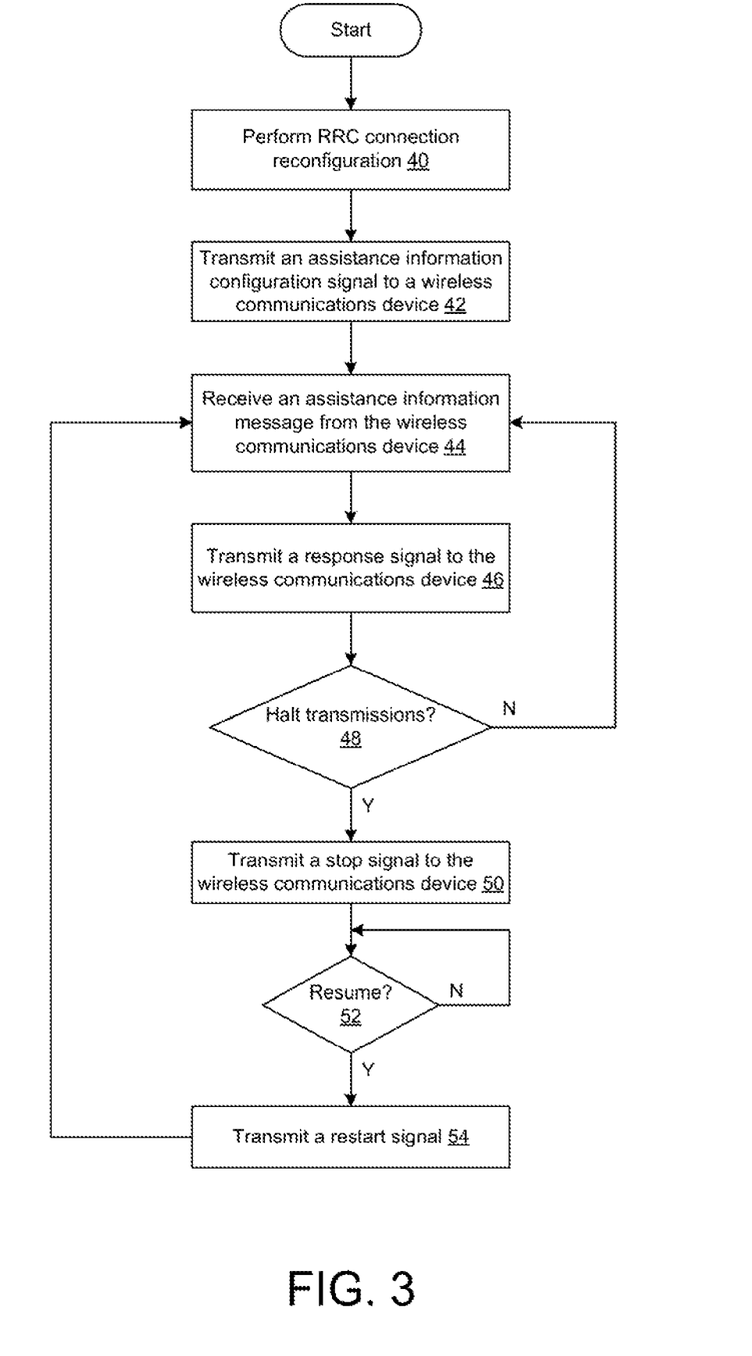
FIG. 3 is a flow-diagram of a representative method of managing assistance information transmissions by a wireless communications device.
Figure 4:
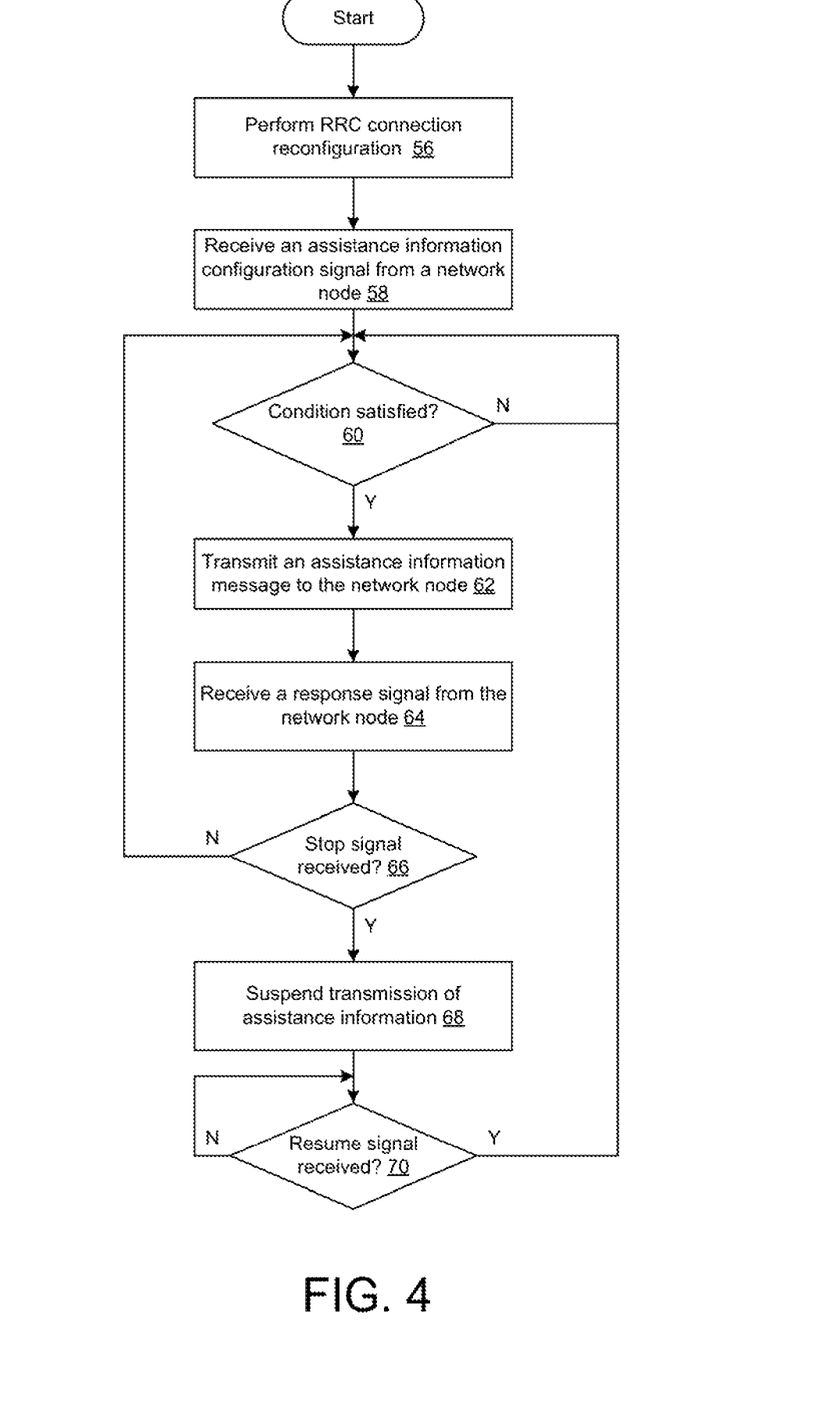
FIG. 4 is a flow diagram of a representative method of transmitting assistance information in accordance with a network-managed configuration.

An exemplary signaling protocol and operations to enable network-managed assistance information transmissions will be described with reference to FIGS. 3-5. FIG. 3 illustrates an exemplary flow diagram representing steps that may be carried out by a network node (e.g. base station 12, CN node 17, or a combination of both) to configure and control assistance information transmissions by a wireless communications device (e.g. UE or electronic device 14). Complimentary operations of the wireless communications device are shown in FIG. 4, which depicts an exemplary flow diagram representing steps that may be carried out by the wireless communications device when performing assistance information transmissions. Although illustrated in a logical progression, the blocks of FIGS. 3 and 4 may be carried out in other orders and/or with concurrence between two or more blocks. Therefore, the illustrated flow diagrams may be altered (including omitting steps or adding steps not shown in order to enhance description of certain aspects) and/or may be implemented in an object-oriented manner or in a state-oriented manner. Also, the method represented by FIG. 3 may be carried out apart from the method of FIG. 4 and vice versa.

Turning now to actions carried out by the network node, shown in FIG. 3, an exemplary logical flow of carrying out network-based management of assistance information transmissions by wireless communications devices may start in block 40. Here, radio resource control (RRC) connection reconfiguration may be performed between the network node and a wireless communications device. In one aspect, RRC connection reconfiguration may generally activate assistance information transmissions in the wireless communications device similar to the configuration in LTE that cause UEs to transmit power preferences as described above. After block 40, the wireless communications device may be configured to transmit assistance information according to a default or standard operation. In a further aspect, the RRC connection reconfiguration may include a baseline configuration for the wireless communications device.

In block 42, the network node may transmit an assistance information configuration signal to the wireless communications devices. The assistance information configuration signal is one embodiment of a configuration message or one example of a type of information that may be included in the configuration message sent by the network node. This signal may be sent on RRC signaling or layer 1 signaling (e.g. PDCCH) if device specific and/or broadcasted if cell specific. The assistance information configuration signal specifies details on how and when the wireless communications device should transmit assistance information related to power saving operations. For example, the signal may indicate information that specifies which power saving techniques (e.g. which device configurations) that the wireless communication devices should indicate a preference for in transmitted assistance information. This information may be a bitmap, where each bit is associated with a particular power saving technique. In addition, the assistance information configuration signal may indicate triggering parameters or conditions that, when satisfied, trigger the wireless communications device to transmit the assistance information. These trigger conditions may apply to all power saving techniques activated, or individual trigger conditions may be respectively associated with individual techniques. In the case of individual trigger conditions, the wireless communications device may be triggered to only transmit assistance information corresponding to the satisfied condition.

The assistance information configuration signal transmitted in block 42 may also include timing parameters. These parameters may include one or more time intervals between transmissions and/or one or more values for a maximum number of repeated transmissions. As with the trigger conditions above, the intervals and maximum number of retransmissions may be technique or adaptation specific, or may apply to all techniques.

In addition, the assistance information configuration signal may include resource allocation information that specifies, for example, time and frequency information for transmission of assistance information. The frequency information could relate to a part of an allocated frequency within a frequency band. The allocated frequency part is sometimes denoted a bandwidth part (BWP). In another example, the resource allocation information could specify a control signal to use for the transmission of assistance information.

In block 44, the network node may receive an assistance information message from the wireless communications device. The assistance information may indicate a list of power saving techniques the wireless communications devices prefers to be executed. That is, the assistance information may indicate the adaptations that wireless communications device requests be made for power saving purposes. The assistance information may also indicate preferred parameter values for the adaptations. For example, the assistance information may indicate a request to adapt one or more time-domain operation, frequency-domain operation, an antenna configuration, or a processing configuration. A bitmap may be used to convey these preferences. The list of preferences included may be subject to the configuration information transmitted in block 42. In addition, the transmission of the assistance information, or portions thereof, may be subject to the trigger conditions and/or timing parameters described above.

In block 46, the network node may transmit a response signal to the wireless communications device. The response signal may include an acknowledgement or grant of zero or more adaptation requests from the assistance information received in block 44. The response signal may also include NACKs for rejected adaptation requests. Still further, the response signal may include configuration information similar to the information described above as included in the assistance information configuration signal transmitted in block 42. In one embodiment, the signal in block 42 may not be sent. Accordingly, the configuration information included in the response signal changes a default or baseline configuration for assistance information transmissions. In another embodiment, the configuration information in the response signal updates or overrides the configuration information included in the previous signal transmitted in block 42.

In block 48, it is determined whether or not assistance information transmissions should be halted. For example, the network node may determine that it is unlikely that any power saving requests will be granted within some threshold amount of time. In such cases, the network node may determine that transmissions should be suspended to avoid unnecessary signaling. If transmissions are to continue, the method may return to block 44 where a subsequent assistance information message may be received by the network node. If the transmission are to be suspended, the network node transmits a stop signal to the wireless communications device in block 50. In block 52, it is determined whether or not transmissions should resume. If not, the decision in block 52 is periodically revisited. When it is determined that transmissions should resume, the network node transmits a restart signal in block 54. Thereafter, the assistance information transmissions resume and may be received in block 44. The resumed transmissions may conform to a previous configuration signaled in block 42 and/or block 46, or a baseline or default configuration.

Referring to FIG. 4, exemplary actions carried out by the wireless communications device (e.g., electronic device 14) are illustrated. The actions carried out by the wireless communications device may, in some case, be complementary to the actions carried out by the network node, which were described above. The logical flow for network-managed assistance information transmission by the wireless communications device may start in block 56. In block 56, RRC connection reconfiguration may be performed between the network and the wireless communications device.

In block 58, an assistance information configuration signal is received from the network. The assistance information configuration signal may include configuration information described above and corresponds to the signal from block 42 of FIG. 3. This signal may be optionally sent by the network node as indicated above. In block 60, it is determined if a trigger condition or timing condition in a current assistance information configuration is satisfied. The condition may be from a default configuration (e.g. from RRC connection reconfiguration or standard-based) or a network-managed configuration specified in configuration information (e.g. received in block 58 or block 64) depending on whether or not such network-managed configurations are received prior to the transmission. If no conditions are satisfied, the method may revisit this decision later. If a condition is satisfied, the wireless communications device may transmit an assistance information message in block 62. The message may include information specified in the current assistance information configuration as provided by the network in blocks 58 and/or 64, for example. Further, the assistance information message may be transmitted repeatedly, with a certain interval for instance, until the wireless communications device receives an acknowledgement from the network node or until a maximum number of attempts are executed, for example.

In block 64, the wireless communications device may receive a response signal. In one embodiment, the response signal is simply an acknowledgement. Accordingly, block 64 is optional in that the wireless communications device may not receive the response signal. In such cases, the wireless communications device may interpret this as a NACK (e.g. that the network node is not granting the request). In another embodiment, the response signal may be an explicit NACK. Still further, the response signal is transmitted by the network node and may include the information described above with reference to block 46 of FIG. 3. In block 66, it is determined whether or not a stop signal is received from the network node. If not, the wireless communications device continues transmissions of assistance information in accordance with configured timing and/or trigger conditions. Following reception of the response signal, a subsequent transmission of assistance information may be in the form of a repeat request. For example, the response signal from block 64 may not have granted a particular request for a power saving adaptation. Accordingly, the wireless communications device may transmit a flag that reasserts previously transmitted assistance information. The repeat request may be subject to its own timing conditions (e.g. interval and maximum number of retransmissions) and/or trigger conditions.

In block 66, if it is determined that a stop signal is received, the wireless communications device may suspend transmission of assistance information messages in block 68. After suspension, the wireless communications device 70 may periodically determine whether a resume signal is received and, if so, return to block 60 to resume transmissions. The resumed transmissions may occur in accordance with a previous configuration signaled by the network in blocks, 56, 58 and/or 64.

Figure 5:
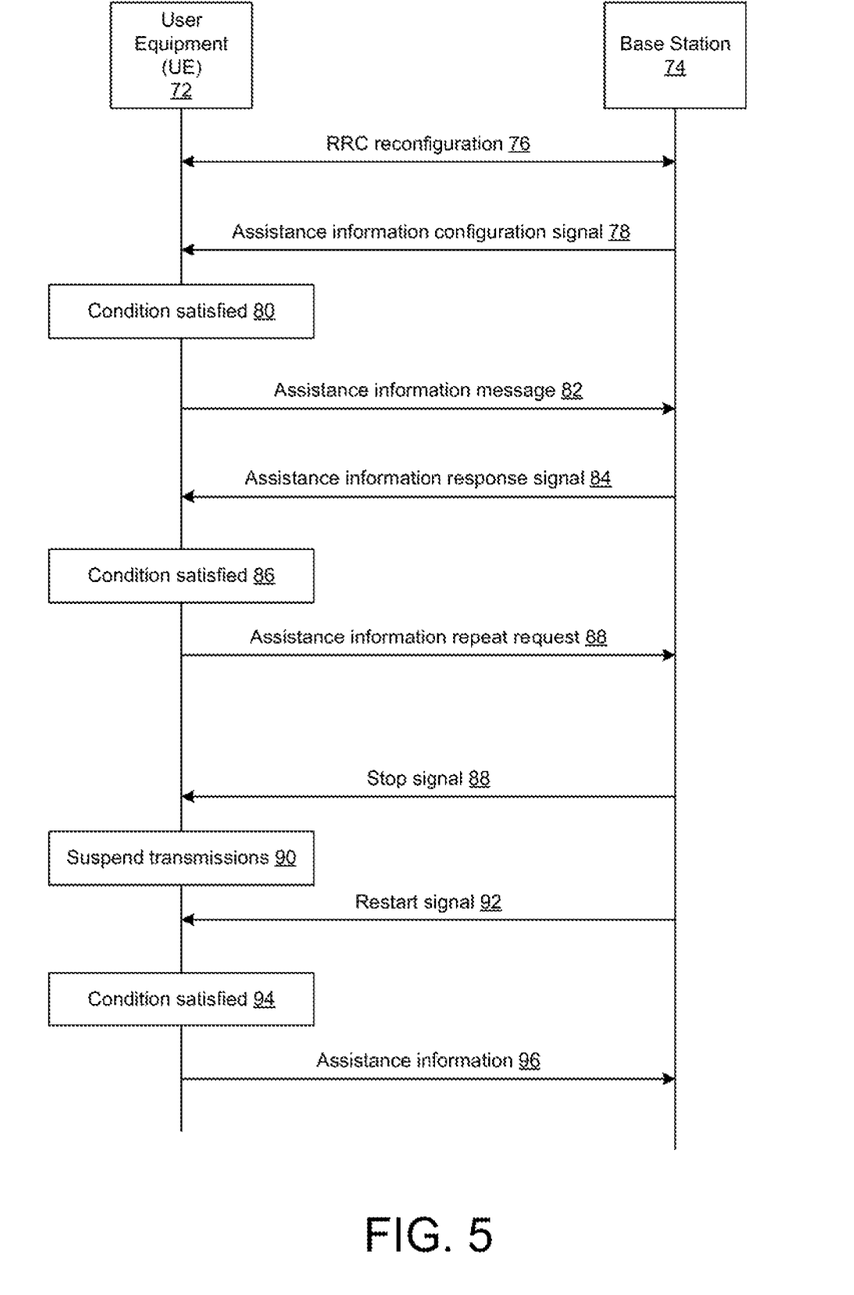
FIG. 5 is a signaling diagram of an exemplary procedure to perform dynamic, network-based control of assistance information transmissions by wireless communications devices.

Turning to FIG. 5, an exemplary signaling diagram for network-managed assistance information is illustrated. As shown in FIG. 5, a base station 74, which may be similar to base station 12 described above, interacts with a UE 72, which may be similar to electronic device 14 described above. Initially, base station 74 and UE 72 may perform a RRC connection reconfiguration 76. Subsequently, the base station 74 may optionally transmit an assistance information configuration signal 78, which may contain configuration information as described above. The UE 72 may transmit an assistance information message 82. Message 82 may be optionally triggered by a satisfied condition 80. The condition 80 and/or the content of message 82 may subject to the configuration information include in signal 78.

Upon receiving message 82, the base station 74 transmits an assistance information response signal 84. As described above, signal 84 may also include configuration information similar to signal 78. As shown in FIG. 5, upon satisfaction of condition 86, the UE 72 may transmit an assistance information repeat request 88.

In accordance with another aspect, the network may suspend and resume assistance information transmissions. For instance, the base station 74 may transmit a stop signal 90, which causes the UE 72 to suspend transmissions 92. The base station 74 may transmit a restart signal 94 to resume transmissions by the UE 72. For instance, after receiving the restart signal 94, the UE 72 may transmit an assistance information message 98 upon optional satisfaction of condition 96. The message 98 may conform to a previous configuration provided during RRC reconfiguration 76, included in signal 78, and/or included in signal 84.

It is to be appreciated that the above sequence described in FIG. 5 is exemplary and alternative orders may be employed.

CONCLUSION

Although certain embodiments have been shown and described, it is understood that equivalents and modifications falling within the scope of the appended claims will occur to others who are skilled in the art upon the reading and understanding of this specification.

What is claimed is:
1. A method, performed by a network node in a wireless communications network, for controlling transmission of assistance information related to power saving techniques by a wireless communications device, comprising:

transmitting a control message to the wireless communications device that specifies configuration information for transmission of the assistance information relating to a plurality of power saving techniques, the configuration information includes respective configurations for each of the plurality of power saving techniques, the respective configurations include a condition that triggers a transmission of assistance information associated with a respective power saving technique of the plurality of power saving techniques; and receiving the assistance information transmitted from the wireless communications device in accordance with the configuration information.

2. The method of claim 1, wherein the configuration information further includes an indication of one or more power saving techniques of the plurality of power saving techniques for which a preference is to be included in the assistance information.

3. The method of claim 1, wherein the assistance information received from the wireless communications device includes respective preferences associated with one or more power saving techniques of the plurality of power saving techniques.

4. The method of claim 1, further comprising transmitting a response signal to the wireless communications device that includes an acknowledgment to proceed with one or more power saving techniques of the plurality of power saving techniques indicated as preferred in the assistance information received from the wireless communications device.

5. The method of claim 4, wherein the acknowledgement includes a set of acknowledgements respectively associated with the one or more power saving techniques indicated as preferred in the assistance information.

6. The method of claim 4, wherein the acknowledgement is transmitted via a control channel to ensure execution of power savings techniques by the wireless communications device with lower latency.

7. The method of claim 1, wherein the plurality of power saving techniques relate to at least one of:
a configuration of bandwidth parts,
a configuration of carrier aggregation, or
a configuration of MIMO operations.

8. The method of claim 4, wherein the response signal to the wireless communications device indicates that at least one power saving technique is not granted.

9. The method of claim 1, further comprising receiving a repeat request from the wireless communications device that reasserts references previously specified in the assistance information.

10. The method of claim 1, further comprising transmitting a signal to the wireless communications device to halt assistance information transmissions.

11. The method of claim 10, further comprising transmitting a signal to wireless communications device to restart assistance information transmissions.

12. A method for transmitting assistance information related to power saving operations, comprising:

receiving a control message from a network node of a wireless communications system, the control message includes configuration information for transmissions of assistance information relating to a plurality of power saving techniques, the configuration information includes respective configurations for each of the plurality of power saving techniques, the respective configurations include a condition that triggers a transmission of assistance information associated with a respective power saving technique of the plurality of power saving techniques; and transmitting an assistance information message to the network node in accordance with the configuration information.

13. The method of claim 12, wherein the configuration information further includes an indication of one or more power saving techniques of the plurality of power saving techniques for which a preference is to be included in the assistance information.

14. The method of claim 12, wherein transmitting the assistance information message comprises transmitting assistance information associated with power saving techniques corresponding to satisfied trigger timing conditions.

15. The method of claim 12, wherein the assistance information message includes preferences for power saving adaptations to one or more of:
a time-domain operation;
a frequency-domain operation;
an antenna configuration; or
a signal processing configuration.

16. The method of claim 12, wherein the plurality of power saving techniques relate to at least one of:
a configuration of bandwidth parts,
a configuration of carrier aggregation, or
a configuration of MIMO operations.

17. The method of claim 12, wherein the respective configurations further include a resource allocation for transmission of the assistance information associated with the respective power saving technique.

18. The method of claim 12, further comprising transmitting a repeat request that reasserts preferences specified in a previous assistance information message.

19. The method of claim 12, further comprising:
receiving a signal from the network node to halt assistance information transmissions;
receiving a signal from the network node to restart assistance information transmissions; and
resuming assistance information transmission in accordance with the configuration information included in the control message.

20. A network node in a wireless communication system, comprising
a wireless interface over which wireless communications with wireless communications devices are carried out; and
a control circuit configured to manage transmissions of assistance information by the wireless communications devices, wherein the control circuit causes the network node to:
transmit a control message to a wireless communications device that specifies configuration information for transmission of assistance information relating to a plurality of power saving techniques, the configuration information includes respective configurations for each of the plurality of power saving techniques, the respective configurations include a condition that triggers a transmission of assistance information associated with a respective power saving technique of the plurality of power saving techniques; and
receive the assistance information message transmitted from the wireless communications device in accordance with the configuration information.

* * * * *